United States Patent [19]
Bealkowski et al.

[11] Patent Number: 5,193,174
[45] Date of Patent: Mar. 9, 1993

[54] SYSTEM FOR AUTOMATICALLY REDIRECTING INFORMATION TO ALTERNATE SYSTEM CONSOLE IN RESPONSE TO THE COMPARISON OF PRESENT AND DEFAULT SYSTEM CONFIGURATION IN PERSONAL COMPUTER SYSTEM

[75] Inventors: Richard Bealkowski, Delray Beach; Gerald Howard, Pompano Beach; Bharat Khatri, Boca Raton; George Mathew, West Palm Beach; Matthew T. Mittelstedt, Delray Beach; Lynda M. Salvetti, Boca Raton; Richard A. Sudsassi, Boca Raton; Carolyn J. Zemanek, Boca Raton, all of Fla.

[73] Assignee: International Business Machines Corporation, Armonk, N.Y.

[21] Appl. No.: 557,035

[22] Filed: Jul. 23, 1990

[51] Int. Cl.⁵ .................... G06F 7/02; G06F 11/00
[52] U.S. Cl. .................... 395/500; 395/800; 364/260.4; 364/261.2; 364/DIG. 1
[58] Field of Search ............. 395/275, 700, 425, 500, 395/800; 380/4

[56] References Cited

U.S. PATENT DOCUMENTS

| | | | |
|---|---|---|---|
| 4,499,536 | 2/1985 | Gemma et al. | 395/425 |
| 4,589,063 | 5/1986 | Shah et al. | 395/275 |
| 4,590,556 | 5/1986 | Berger et al. | 395/700 |
| 4,591,892 | 5/1986 | Buonomo | 395/375 |
| 4,604,690 | 8/1986 | Crabtree et al. | 395/700 |
| 4,679,166 | 7/1987 | Berger et al. | 395/650 |
| 5,014,193 | 5/1991 | Garner et al. | 395/275 |
| 5,022,077 | 6/1991 | Bealkowski et al. | 380/4 |

Primary Examiner—Thomas C. Lee
Assistant Examiner—Meng-Ai T. An
Attorney, Agent, or Firm—Winfield J. Brown, Jr.; Stephen A. Terrile

[57] ABSTRACT

An apparatus and method for configuring a personal computer system for operation with a plurality of optional system consoles. A first non-volatile memory means stores present system configuration data. The present system configuration data is representative of the type of system console connected to the system. A diagnostic module accesses this configuration data for determining the operational validity of the system based upon a predetermined system configuration. The diagnostic module compares the present configuration data to the predetermined configuration. Based upon the comparison the diagnostic module modifies the operation of the system to communicate with the type of system console connected to the system.

2 Claims, 6 Drawing Sheets

SYSTEM FOR AUTOMATICALLY REDIRECTING INFORMATION TO ALTERNATE SYSTEM CONSOLE IN RESPONSE TO THE COMPARISON OF PRESENT AND DEFAULT SYSTEM CONFIGURATION IN PERSONAL COMPUTER SYSTEM

FIELD OF THE INVENTION

This invention relates to personal computer systems and permits a personal computer system to be configured to at least one of a plurality of system consoles.

BACKGROUND DISCUSSION

Personal computer systems in general, and IBM Personal Computers in particular, have obtained widespread use for providing computer power to many segments of today's modern society. Personal computer systems are usually defined as a desk top, floor standing, or portable microcomputer that includes a system unit having a system processor, a display monitor, a default personal computer (PC) keyboard, a mouse, one or more diskette drives, a fixed disk storage, and an optional printer. One of the distinguishing characteristics of these systems is the use of a motherboard or system planar to electrically connect these components together. These systems are designed primarily to give independent computing power to a single user and are inexpensively priced for purchase by individuals or small businesses. Examples of such personal computer systems are IBM's Personal Computer AT and IBM's Personal System/2 Models 25, 30, 50, 60, 70 and 80.

New uses for personal computer systems have rapidly developed due to improved performance and capabilities of new microprocessors and the availability of multi-tasking operating systems. Personal computers are now commonly used as file servers, print servers, network nodes, and in other applications that require the simultaneous support of multiple users. This type of operation, called server mode, is usually associated with a personal computer system having a plurality of high volume mass storage devices for holding a database for a small business or a corporate department. These servers typically run independently of an operator and are usually connected by a local area network (LAN) to other personal computers whose users need to access the database information.

It should be appreciated that independent operation of the server is a substantial factor in achieving marketable success of these machines. As mentioned previously, a normally configured personal computer has required a PC keyboard and display to be an integral part of the personal computer system at all times. With the increasing usage of servers and other factors, there is now a requirement that the personal computer system be capable of being operated with either; a traditional PC keyboard, a traditional display, or an ASCII terminal connected to a communications port or with no keyboard, no display, or no terminal.

However, the requirement that a computer system be capable of being operated without a traditional PC keyboard or display causes problems with diagnostic software procedures which have been permanently built into these types of personal computer systems. In particular, when IBM first began shipping the IBM PC in 1981, it included diagnostic features that were generally not available before in personal computers. These diagnostic features were incorporated into a power on self test routine commonly referred to as POST. The POST is composed of diagnostic routines or modules contained in a planar ROM firmware that test all the main system components at power on time. Whenever the computer is started up or reset, POST automatically performs a series of tests that check various components in the system. The components tested by this procedure were deemed to be primary items critical to the operation of the system. Primary items included the CPU, ROM, planar support circuitry, memory, PC keyboard, display, and major peripherals such as a floppy or fixed disk. Although these tests were brief and not as thorough as with other disk-based diagnostics that were available; the POST process provided error or warning messages whenever a major faulty component was encountered. Two types of messages were usually provided: first an audio code and second a display screen message or code. If an error was detected during the POST procedure an error message was displayed or an audio message was sounded. These messages were and still are normally in the form of a numeric code several digits long. For example, the numeric code of 301 on the display can indicate that the PC keyboard is not connected to the system.

As is readily apparent, two of the major components that are tested during the POST process are the PC keyboard and display. As mentioned before, if a PC keyboard is not connected to the system or malfunctions, a 301 numeric message is indicated on the display. The user is then requested to enter the "F1" key to continue. As is apparent, the absence of the PC keyboard negates the user entering the "F1", an unworkable situation.

With the advent of servers which normally do not need to operate with a keyboard or display, problems occur with POST halting the computer in the absence of the keyboard or display when in actuality the server is designed to run in this configuration. It has therefore become necessary to provide an optional keyboard.

SUMMARY OF THE INVENTION

It is therefore an object of the present invention to permit the configuration of these types of personal computers to be changed such that the operation of a personal computer system without a PC keyboard or display proceeds without interruption of the power-on procedures.

It is another object of the present invention to permit keyboardless operation of these types of personal computers.

It is another object of the present invention to permit the operation of these types of personal computers without the need of a display.

It is yet another object of the present invention to permit a conventional personal computer system to be configured as a server.

Another advantage of the present invention is the replacement of the PC keyboard and display with an ASCII terminal.

Broadly considered, a personal computer system, according to the present invention is configured for operation with a plurality of optional system consoles. A first non-volatile memory means stores present system configuration data. The present system configuration data is representative of the type of system console connected to the system. A diagnostic module accesses this configuration data for determining the operational validity of the system based upon a predetermined system configuration. The diagnostic module compares the present system configuration data to the predetermined system configuration. Based upon the comparison the diagnostic module modifies the operation of the system to communicate with the type of system console connected to the system.

DESCRIPTION OF A PREFERRED EMBODIMENT

The following detailed description is of the best presently contemplated mode for carrying out the invention. This description is not to be taken in a limiting sense but is made merely for the purpose of illustrating the general principles of the invention since the scope of the invention is best defined by the appending claims.

Figure 1:
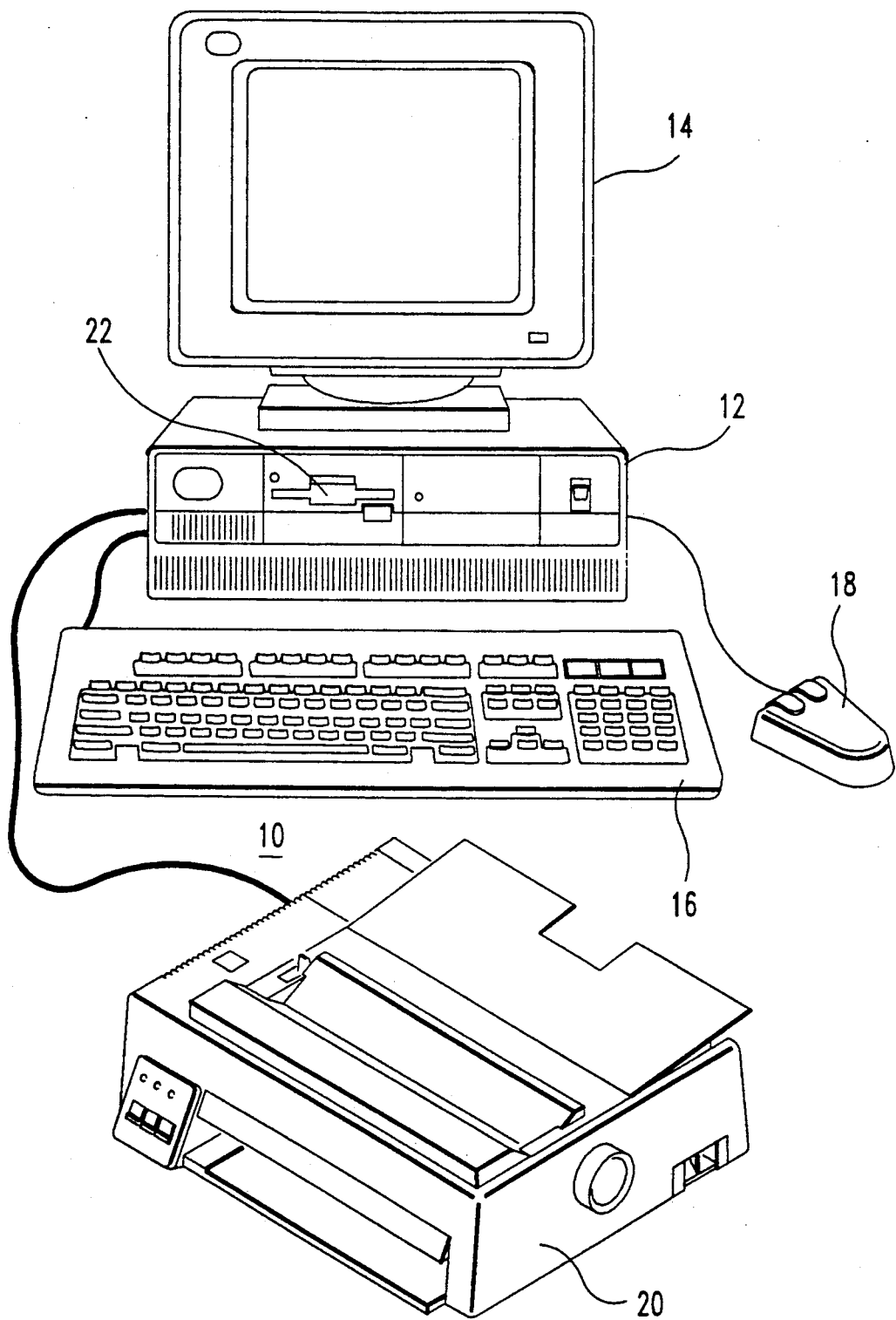
FIG. 1 illustrates a personal computer system according to the present invention.

Referring now to the drawings, and in particular to FIG. 1, there is shown a Personal Computer System 10 in which the present invention can be employed. As shown, the Personal Computer System 10 comprises a number of components which are interconnected together. More particularly, a system unit 12 is coupled to and can drive an optional monitor 14 (such as a conventional video display). A system unit 12 can also be optionally coupled to input devices such as a PC keyboard 16 or a mouse 18. An optional output device such as a printer 20 can also be connected to the system unit 12. Finally the system unit 12 may include one or more mass storage devices such as the diskette drive 22.

As will be described below, the system unit 12 responds to input devices such as the PC keyboard 16, the mouse 18, or local area networking interfaces. Additionally, input/output devices, such as the diskette drive 22, display 14, printer 20, and local area network communication system are connected to the system unit 12 in a manner well known. Of course, those skilled in the art are aware that other conventional components can also be connected to the system unit 12 for interaction therewith. In accordance with the present invention, the computer system 10 includes a system processor that is interconnected to a random access memory (RAM), a read only memory (ROM), and a plurality of I/O devices.

In normal use, the personal computer system can be designed to give independent computing power to a small group of users as a server or a single user and is inexpensively priced for purchase by individuals or small businesses. In operation, the system processor functions under an operating system, such as IBM's OS/2 operating system or DOS. This type of operating system includes a BIOS interface between the I/O devices and the operating system. BIOS which can be stored in a ROM on a motherboard or planar includes diagnostic routines which are contained in a power on self test section referred to as POST.

Figure 2:
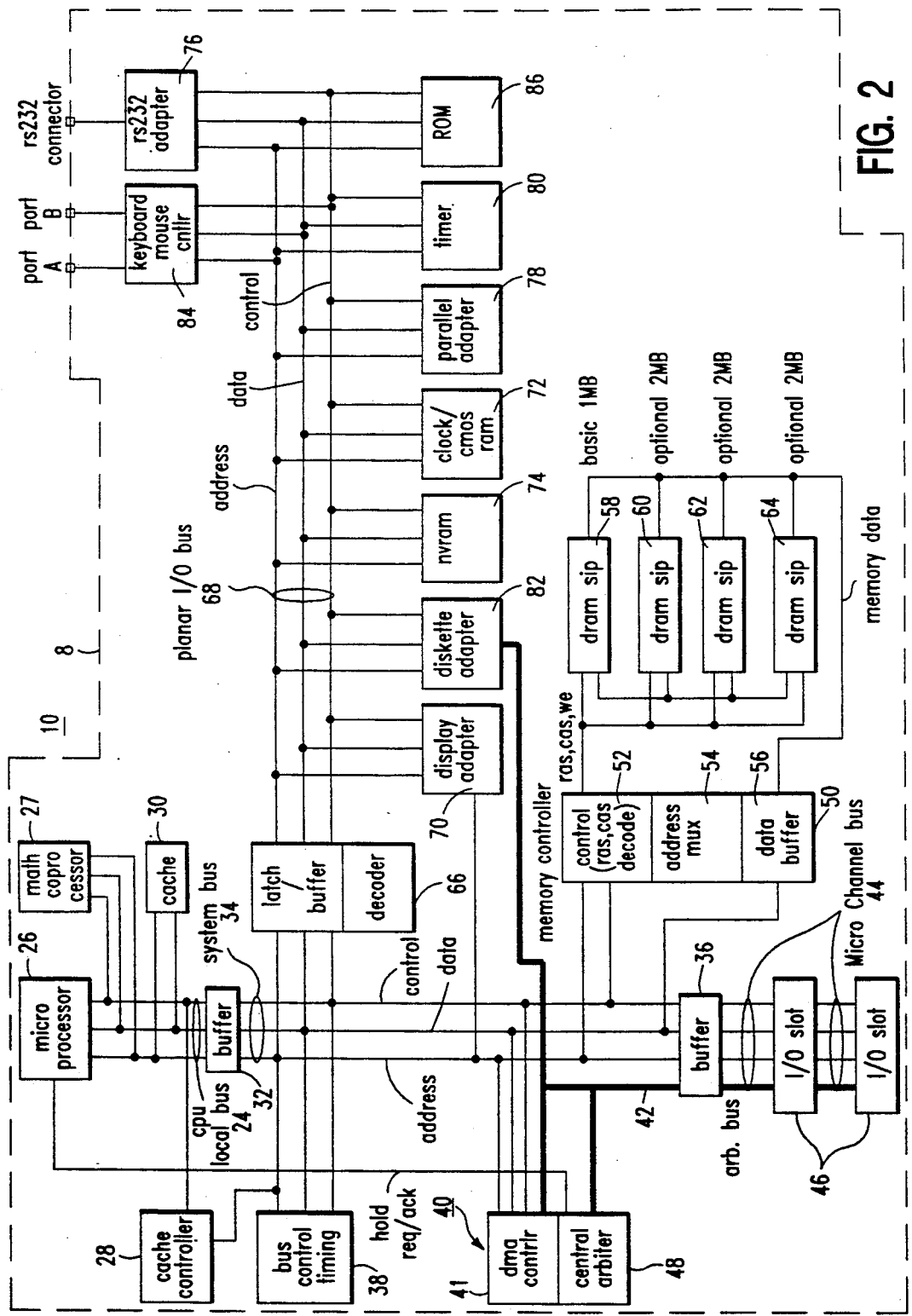
FIG. 2 shows a detailed electronic diagram of the personal computer system of FIG. 7.

Prior to relating the above structure to the present invention, a summary of the operation in general of the Personal Computer System 10 may merit review. Referring to FIG. 2, there is shown a block diagram of the Personal Computer System 10 illustrating the various components of the Computer System 10 in accordance with the present invention. FIG. 2 further illustrates components of the planar 8 and the connection of the planar 8 to the I/O slots 46 and other hardware of the Personal Computer System 10. Connected to the planar 8 is the system processor 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286 or 80486 microprocessor. These particular microprocessors can operate in a real addressing mode or a protected addressing mode. Each mode provides an addressing scheme for accessing different areas of the microprocessor's memory.

Returning now to FIG. 2, the CPU local bus 24 (comprising data, address and control components) provides for the connection of a microprocessor 26, an optional math coprocessor 27, a cache controller 28, and a cache memory 30. Also coupled on the CPU local bus 24 is a buffer 32. The buffer 32 is itself connected to a slower speed (compared to the CPU local bus) system bus 34, also comprising address, data and control components. The system bus 34 extends between the buffer 32 and a further buffer 36. The system bus 34 is further connected to a bus control and timing unit 38 and a DMA unit 40. The DMA unit 40 is comprised of a central arbitration unit 48 and a DMA controller 41. The buffer 36 provides an interface between the system bus 34 and an optional feature bus such as the Micro Channel bus 44. Connected to the bus 44 are a plurality of I/O slots 46 for receiving Micro Channel adapter cards which may be further connected to an I/O device or memory. An arbitration control bus 42 couples the DMA controller 41 and central arbitration unit 48 to the I/O slots 46 and diskette adapter 82. Also connected to system bus 34 is a memory control unit 50 which is comprised of a memory controller 52, an address multiplexer 54, and a data buffer 56. The memory control unit 50 is further connected to a random access memory as represented by the RAM module 58. The memory controller 52 includes the logic for mapping addresses to and from the microprocessor 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between the system bus 34 and a planar I/O bus 68. The planar I/O bus 68 includes address, data, and control components respectively. Coupled along the planar bus 68 are a variety of I/O adapters and other peripheral components such as the display adapter 70 (which is used to drive an optional display 14), a clock 72, nonvolatile RAM 74 (hereinafter referred to as NVRAM), a RS232 adapter 76, a parallel adapter 78, a plurality of timers 80, a diskette adapter 82, a PC keyboard/mouse controller 84, and a read only memory (ROM) 86. The ROM 86 includes the BIOS which further includes the POST module which is used to test the major components of the personal computer system.

The clock 72 is used for time of day calculations. NVRAM 74 is used to store system configuration data. That is, the NVRAM will contain values which describe the present configuration of the system. For example, NVRAM contains information which describe the capacity of a fixed disk or diskette, the type of display, the amount of memory, etc. Of particular importance, NVRAM will contain data which is used to describe the system console configuration; i.e. whether the PC keyboard is connected to the keyboard/mouse controller 84, a display controller is available or the ASCII terminal is connected to the RS232 adapter 76. Furthermore, these data are stored in NVRAM whenever a special configuration program is executed. The purpose of the configuration program is to store values characterizing the configuration of this system to NVRAM which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

It may be appropriate at this point to briefly review the purpose of the present invention. Previous to the present invention, a PC keyboard had to be connected to Port A of the keyboard controller in order for the system to operate. Likewise, Port B of the keyboard controller was permanently assigned to the mouse. Since both ports are mechanically identical, there is a potential for getting a POST keyboard error if the PC keyboard was plugged into the mouse port and the mouse was plugged into the keyboard port.

Another problem was identified when the PC system was configured for server operations. In the server mode, the PC keyboard is not required and to prevent POST from detecting an error due to the absence of the PC keyboard, it was necessary to install a PC keyboard into the PC system. Likewise, when only an ASCII terminal was necessary the user had to unnecessarily install a PC keyboard.

According to one aspect of the present invention, a PC keyboard can be connected to Port A, Port B, or the ASCII terminal can be connected to the RS232 adapter, or if the system is in the server configuration the keyboard, the display or ASCII terminal can be removed thus permitting a keyboardless operation of the system.

To summarize, the personal computer system can be configured with either the PC keyboard, the display, the ASCII terminal, no PC keyboard, no display, or no ASCII terminal. Table I summarizes the normal configurations available for PC systems due to the present invention:

TABLE I

| Configuration | Devices | | |
|---|---|---|---|
| | PC Keyboard | Display | ASCII Terminal |
| Server | | | |

TABLE I-continued

| Configuration | Devices | | |
|---|---|---|---|
| | PC Keyboard | Display | ASCII Terminal |
| Single user | X | X | |
| ASCII Terminal | | | X |

According to Table 1, a normal server configuration will have no PC keyboard, no display, and no ASCII terminal. However, this does not preclude the use of using one of these devices in a server mode. It is entirely possible that a server configuration may include one or more of these devices. For a single user configuration, a normal or default configuration will include a PC keyboard and a display. An ASCII terminal configuration will normally only include an ASCII terminal. As is evident, configuring the system for a selectable system console is extremely advantageous.

GENERAL FLOW OF POST FOR ASCII TERMINAL SUPPORT

Figure 3:
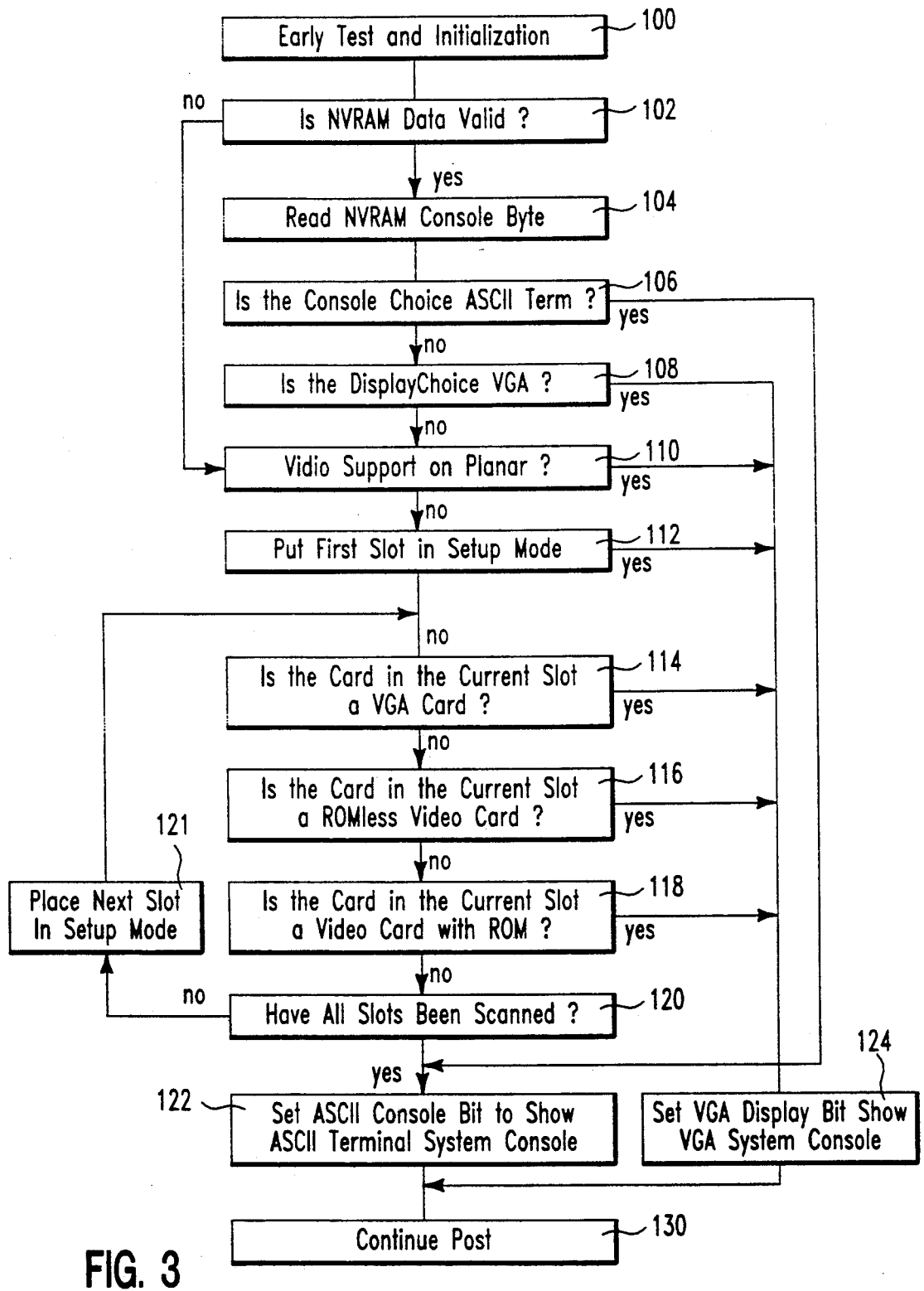
FIG. 3 shows a flowchart for determining if a system console is attached.

FIG. 3 shows the procedure used by POST to identify and establish a configuration for a personal computer system with a selectable system console. When the computer system is powered up, POST initializes and resets the CPU and performs some basic diagnostic checks (step 100). The configuration data stored in NVRAM are checked to ensure that they are valid (step 102). One method to determine the validity is to perform a checksum which is well known to those of ordinary skill in the art. If the data in NVRAM are valid then system console configuration data stored in the NVRAM are read (step 104). The system configuration data are stored into NVRAM through the use of a configuration program. If ASCII Terminal support is selected (step 106) then an ASCII console parameter, such as a bit, is set to indicate ASCII Terminal (step 122). Referring back to step 106, if ASCII Terminal support is not selected then the NVRAM system console configuration data are checked to determine the type of display available. One common type of display available for a personal computer system is known as a VGA display. A VGA display usually has a resolution of 640×480 pixels with a choice of 16 colors. If VGA is selected as the display (step 108) then a Display console parameter is initialized to show the VGA as the system display (step 124).

Referring back to step 102, if the data in NVRAM are not valid or if ASCII Terminal (step 106) or VGA (step 108) are not selected then the planar is checked for video support (step 110). If video support is on the planar then control transfers to step 124 which sets the appropriate configuration parameter for the display. If no video support is on the planar then the first Micro Channel slot is placed in Setup mode, step 112. In the setup mode, a Micro Channel I/O card will send back to the CPU a unique identification signal. This identification signal alerts the CPU as to the type of card connected to the I/O slot. The ID of the card in the slot which is currently in Setup mode is checked to determine if it is a VGA-type card (step 114). If the card is a VGA-type then control is passed to step 124. Here the display configuration parameter is set to enable the CPU to identify and address the VGA-type I/O card.

Referring back to step 114, if the card is not a VGA-type card, then the card in the current slot is checked to see if it is another type of video display card, such as a ROMless video card (step 116). If it is then control is passed to step 124. As mentioned before, the display configuration parameter is set to reflect this type of card. Referring back to step 116, the card in the current slot is checked to determine whether it is another type of video display card, such as a video card with ROM (step 118). If it is, then control is passed to step 124 to configure the system display configuration parameter. If the card in the current slot is none of these, then a test is performed to determine if all the slots have been checked (step 120). If all slots have not been searched then the next slot is placed in Setup mode (step 121) and control then transfers to step (114) to continue searching. When all slots have been scanned (step 120) then the system console parameter is set to a default indicating an ASCII Terminal. After the system console parameter is established because of step (122) or step (124) then POST is allowed to continue (step 130). At this point the system has selected either an ASCII terminal, the type of display, or a default condition.

CONSOLE REDIRECTION FOR ASCII TERMINAL OPERATION

When the system is operated with an ASCII Terminal certain functions such as keyboard and video need to be managed. BIOS INT 10h for video and INT 16h for keyboard need to operate with the ASCII terminal rather than the traditional VGA/keyboard combination.

Note that BIOS is accessed by software interrupts. That is, each BIOS entry point is available through its own interrupt. For example, software interrupts INT 10h accesses the BIOS video routines, while INT 16h accesses the keyboard routine.

Returning to the previous discussion, the video is managed by a redirector and the keyboard is managed by the communications port interrupt handler which places keystrokes into a keyboard circular buffer. This keystroke management allows the INT 16h interface to operate normally.

Included in POST is a process for redirecting the PC keyboard inputs and video outputs to or from the ASCII terminal. This process is known as a console Redirector. The function of the Console Redirector is to redirect video BIOS calls (INT 10H) to an ASCII terminal attached to a serial communications port. The console redirection function is only used when ASCII console support is required during POST. The Console Redirect function can be terminated at the completion of POST. The main purpose of the console redirection is to enable transparent user operation of POST. During this phase, the Console Redirector will only support ASCII text mode. The Console Redirector calls the Asynchronous Communications BIOS to transmit host commands and text to the terminal. These functions include: initialize and attach console device; console input; console output character; console output string; and remove console device.

When ASCII console support is required on the system, video BIOS (INT 10H) is intercepted by the Console Redirector in POST. The intercepting of the Video BIOS (INT 10H) to provide video redirection is accomplished by POST in conjunction with the Attach Console Device function. The Console Redirect function is detached by POST in conjunction with the Remove Console function before exiting POST. The serial communications port is also tested and initialized before any information is output to the console.

CONSOLE REDIRECTION

Figure 4:
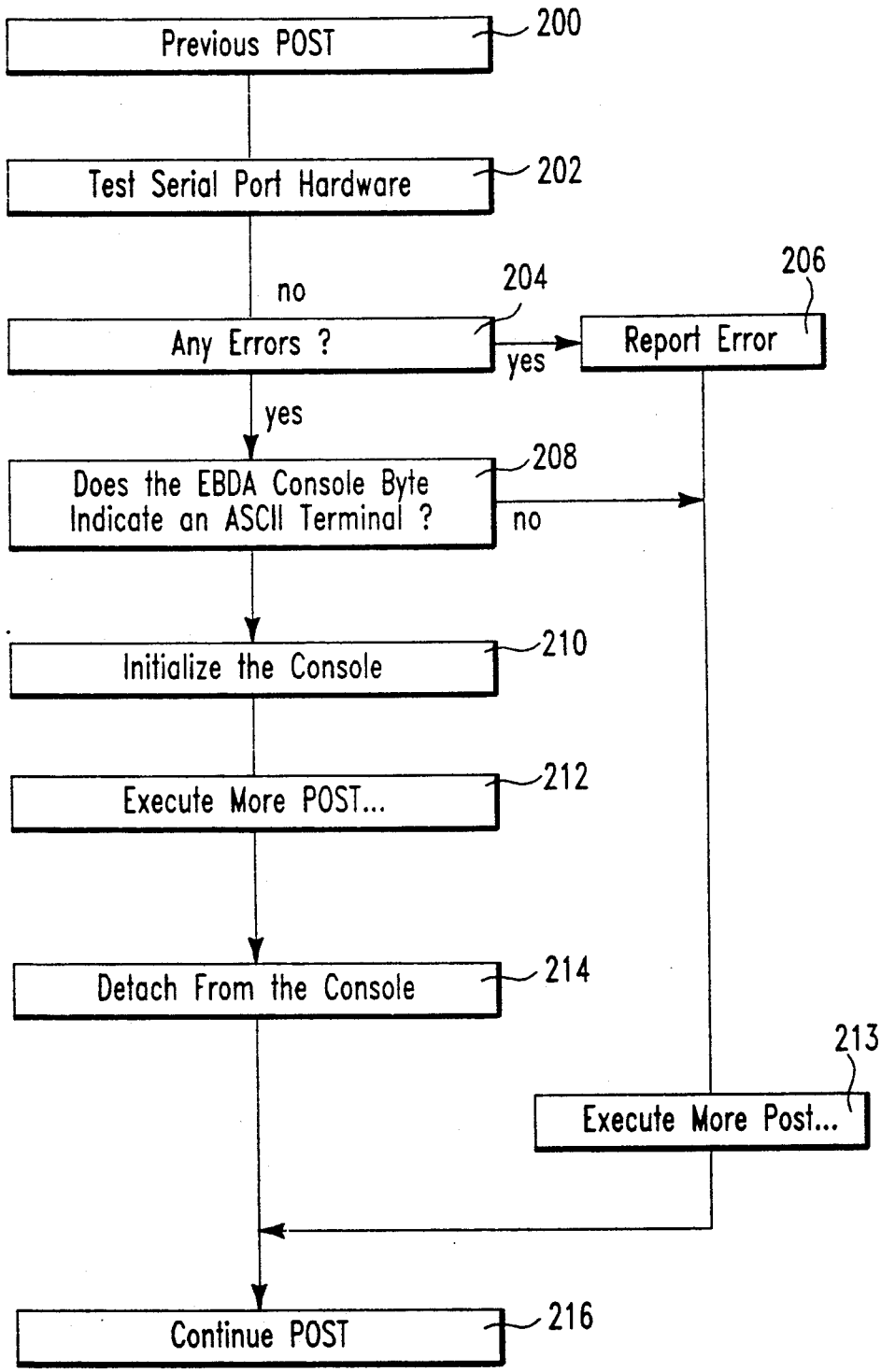
FIG. 4 shows a flowchart illustrating the operation of POST.

Referring to FIG. 4, there is shown a flow chart of the Console Redirection POST code used to redirect POST input and output information to the ASCII terminal. Before the Console Redirection POST code is executed there is a section of POST code which has already executed (step 200). Next, the asynchronous communications port is tested (step 202) to determine if it is operational. If the test is positive, i.e. yes, (step 204), any errors are reported (step 206) and POST continues (step 213). Referring back to step 204, if there are no errors, then the system console parameter data are checked to determine whether an ASCII terminal is to be installed as the console (step 208). If it is, then the console is initialized (step 210) using the initialization and attach function call which performs terminal communication initialization. If an ASCII terminal is not indicated in step (208) then POST is allowed to continue (step 213). After the console is initialized in step (210) additional POST is executed (step 212) to perform test and initialization on other system components. Once the majority of POST has completed the console is detached (step 214) and POST continues (step 216) into the bootstrap phase.

SOFTWARE SUPPORT FOR ASCII TERMINAL

To support an ASCII terminal as the system console, additional functions are added as internal interfaces along with an additional internal function call to BIOS System Services for system console determination. The Asynchronous Console Communications Device extension provides functions that allow the user to communicate with an ASCII terminal. The following functions are provided:

Initialize and attach CONSOLE Device
CONSOLE Input
CONSOLE Output Character
CONSOLE Output String
Remove CONSOLE Device When called for installation, the line parameters used to establish a link with the ASCII terminal are displayed. Once installed, the interrupt handler checks for the Ctrl-C/Ctrl-A/Ctrl-D reboot sequence. If found, a word at a predetermined memory location, such as 40:72H, is initialized to a predetermined value and a system reboot is initiated.

SYSTEM CONSOLE DETERMINATION

The System Console Determination function of BIOS allows the requesting software, such as an applications program, to determine the system console. The system console parameter is checked to determine the system console. For instance, one bit in the system console parameter could be used to determine the system console type. In this particular embodiment, the identification for the system console in the system console parameter could be reflected in the following configuration as follows:

| Bit | Identification |
|---|---|
| 0 = | VGA/keyboard |
| 1 = | ASCII Console |

As is evident, more than one bit could be used for identifying other console system types.

ASCII TERMINAL DRIVER

Figure 5:
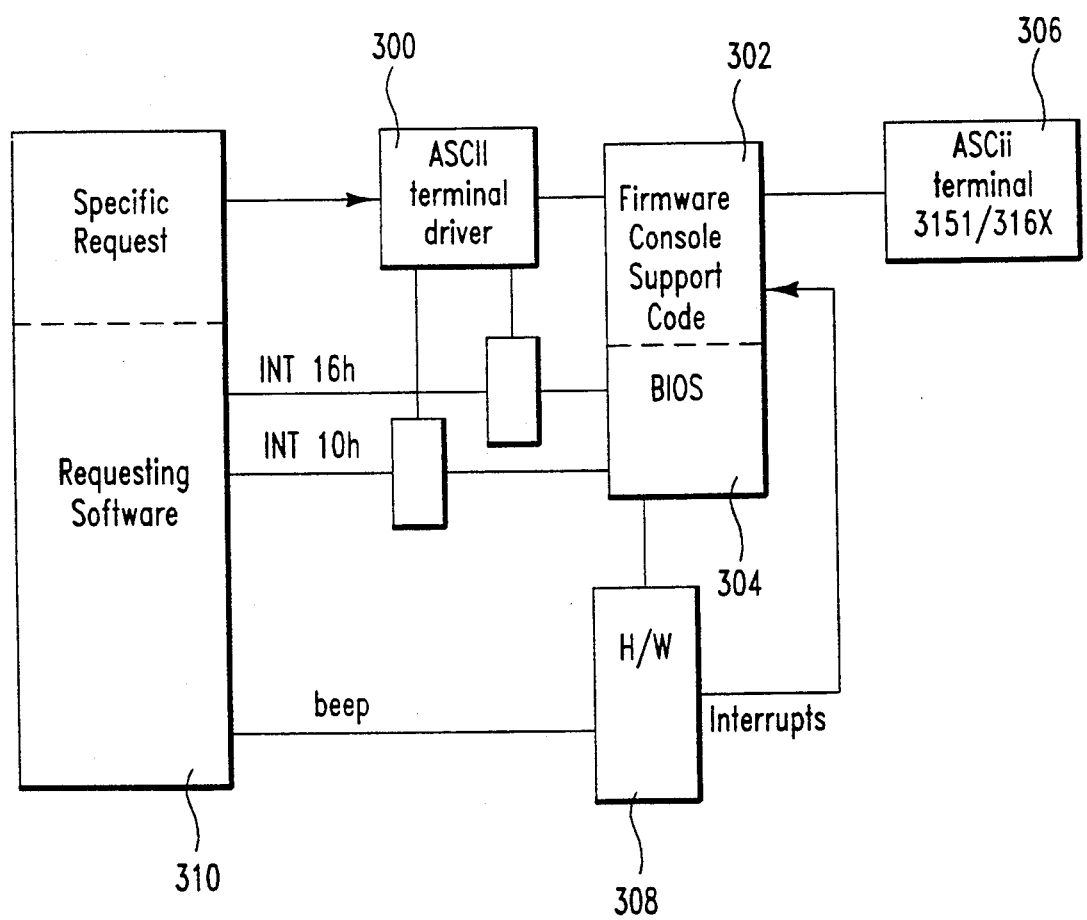
FIG. 5 illustrates the attachment of the ASCII terminal driver to the operating system.

FIG. 5 shows a block diagram illustrating the procedure for intercepting or hooking the normal PC keyboard and video BIOS INT 10h and INT 16h routines 302 with an ASCII terminal driver 300. The ASCII terminal driver 300 communicates through firmware console support code 302 contained in the BIOS module 304. The firmware support code interfaces to an ASCII terminal, such as the 3151/316X as shown in block 306. The ASCII terminal driver captures this data and converts it into video data for the ASCII terminal 306. When requesting software (shown as block 310) performs I/O to or from what it believes is the PC keyboard or display, the ASCII terminal driver intercepts this information and transfers it to the ASCII terminal 306. Specific requests to the ASCII terminal driver 300 are transferred directly from the requesting software. The objectives of the ASCII terminal driver are to:

Set up and maintain a virtual video buffer
Manage the interface between the virtual video buffer and the ASCII terminal
Redirect BIOS INT 10H (video) and provide equivalent functions
Redirect BIOS INT 16H (keyboard) and provide equivalent functions The ASCII terminal driver does not directly manage the asynchronous communication port to which the ASCII terminal is attached, but instead uses the Asynchronous Console Communications Device extension to BIOS for all communications with the ASCII terminal.

A function call is used to access the following ASCII terminal device driver functions which are:

ASCII terminal attached?
diagnostic entry
diagnostic exit
refresh ASCII terminal
return pointer to virtual video buffer The "ASCII terminal attached" function is used to determine if the ASCII terminal is attached as the system console. The "diagnostic entry" function is used by the Diagnostic Control Program before calling each diagnostic module. The "diagnostic exit" function is used by the Diagnostic Control Program after calling each diagnostic module. The "refresh ASCII terminal" function is called to refresh the ASCII terminal screen with the information that has been written to the virtual video buffer. The "return pointer to virtual video buffer" function returns a pointer to the virtual video buffer. If the ASCII terminal is not attached as the system console, the "ASCII terminal attached" function is the only function available, all other function calls will return with no action taken.

Since a physical video buffer is not available when the ASCII terminal is used as the system console, the ASCII terminal driver sets up and maintains a virtual video buffer. The virtual video buffer is a 4000 byte buffer which contains the character and corresponding attribute data for the information currently displayed on the 80×25 ASCII terminal screen. This buffer corresponds to the physical video buffer found on video adapter cards. After writing to the virtual video buffer, a call must be made to the ASCII terminal driver to refresh the ASCII terminal screen with the information written to the virtual buffer. This buffer is located within the device driver.

When the ASCII terminal is used as the system console, BIOS INT 10H (video) is redirected to the ASCII terminal driver and the following functions are provided:

02H—Set cursor position
03H—Read cursor position
06H—Scroll active page up
07H—Scroll active page down
08H—Read attribute/character at cursor position
09H—Write attribute/character at cursor position
0AH—Write character at cursor position
0FH—Read current video state
13H—Write string The following modified BIOS INT 10H functions are provided by the ASCII terminal driver:

00H—Set mode
01H—Set cursor type

The ASCII terminal driver supports only page 0 and video mode 3. An attempt to set any other page or video mode will result in no action being taken. Since the ASCII terminal supports only blink, reverse video, underscore, and high intensity attributes; therefore, the ASCII terminal driver uses an attribute conversion routine to convert mode 3 attributes to ASCII terminal supported attributes.

When the ASCII terminal is used as the system console, BIOS INT 16H is redirected to the ASCII terminal driver. The ASCII terminal driver calls the console extension to the communications interface to return an ASCII character from its buffer. The ASCII terminal driver then looks up and attaches the appropriate scan code before returning to the caller.

The following BIOS INT 16H functions are provided:

00H—Keyboard read
01H—Keystroke status

The following BIOS INT 16H functions are provided, but return the same information as function 00H (keyboard read) and 01H (keyboard status):

10H—Extended keyboard read
11H—Extended keystroke status

CONSOLE SELECT UTILITY

The console select utility permits console configuration data to be entered into the system console parameter stored in NVRAM. This allows the user to select one of the following options for system console which is then stored in the system console configuration parameter:

VGA/key board is system console
ASCII terminal is system console
No system console When the user selects the ASCII terminal as the system console, the utility allows the user to change the following line configuration parameters required to establish a link with the ASCII terminal:

baud rate
number of bits in character
parity
number of stop bits

The information for the line configuration is stored in the NVRAM. When the user selects the ASCII terminal as the system console, or when the user selects no system console, the console select utility allows for video adapters to be removed from the configuration.

KEYBOARDLESS OPERATION

To implement keyboardless operation three problems arise. First, a keyboard must always be initialized if service is needed. This is necessary to allow the Customer Engineer to access the reference diskette or advanced diagnostics. Second, a missing keyboard and a defective keyboard may look alike from a software perspective. Third, more than one kind of system configuration needs keyboardless support. Both systems configured as servers and systems with an ASCII Console need the additional support provided by keyboardless operation.

POST must determine which port has a keyboard installed. Therefore, software must have the ability to differentiate between a keyboard and a mouse. This is accomplished by reading an ID from the keyboard and mouse. Since the IDs are similar for both keyboards and mice, the "READ ID" procedure must test for valid IDs and not invalid IDs. This is to circumvent the condition where a mouse looks like a defective keyboard, and/or a keyboard looks like a defective mouse. Since, this method uses the existence of a keyboard first and then the existence of a mouse to determine the configuration of the system, a default setup is not relied upon when a keyboard is not found. Physical port A is scanned first, and physical port B is scanned second. Therefore, both ports are truly switchable and the external configuration is solely responsible for the setup of the ports. This situation is different from previous switchable port implementations for the keyboard and mouse that used the presence or absence of the keyboard in the first connector as the sole test for setting the configuration. For a system that has a keyboard as a mandatory piece of equipment, the single test for a keyboard in port A and port B is sufficient to configure the system correctly.

Figure 6:
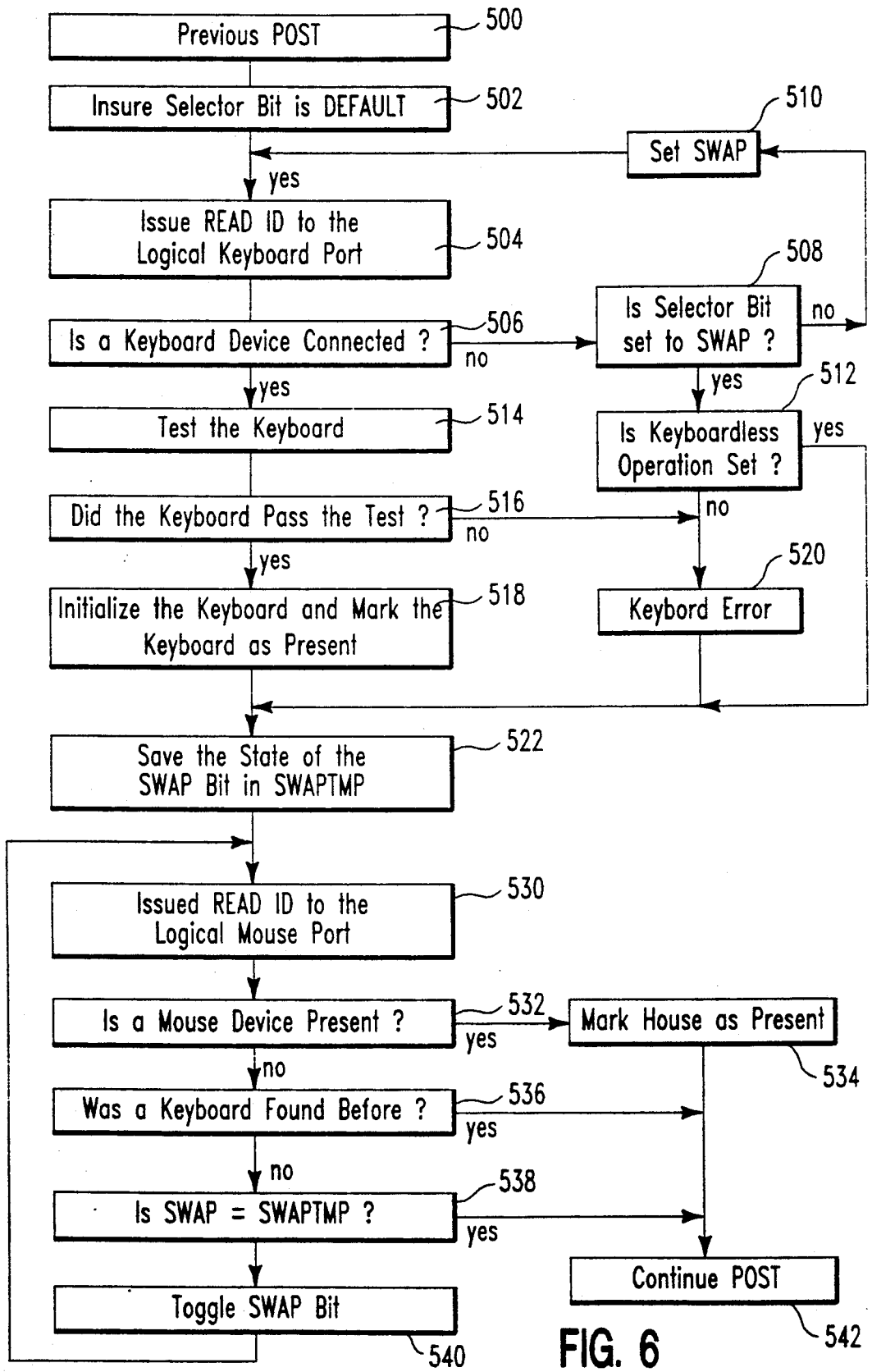
FIG. 6 illustrates the operation of POST.

POST initializes the keyboard controller to either the DEFAULT or the SWAP state. To determine the correct state, the following method is implemented. The physical keyboard port is tested and initialized. If a keyboard is found, POST sets the state as DEFAULT. If a keyboard is not found, the physical mouse port is tested and initialized. If a keyboard is found, POST sets the state as SWAP. If no keyboard is found in either port, the mouse determines the state of the port assignment. FIG. 6 illustration gives the complete flow for determining the port selection.

The procedure used to initialize the keyboard and mouse subsystems is shown in FIG. 6. Since this procedure is a portion of the overall POST this section occurs after other POST activities have already been completed (step 500).

Two states are defined to implement the swapability of the keyboard and mouse ports. The first state is the DEFAULT state. This state maps the logical keyboard port to the physical keyboard port. Likewise, the logical mouse port is mapped to the physical mouse port. The second state is the SWAP state. In this state, the logical ports are assigned to the opposite physical ports. The logical keyboard port accesses the physical mouse port directly and vice versa. The enhanced keyboard controller supports both the DEFAULT and the SWAP states.

Next, POST sets the Selector state to its DEFAULT setting (step 502). A "READ ID" command is issued to the logical keyboard port (step 504). Based on the ID returned, if any, a decision is made if there is in fact a keyboard attached to the current logical keyboard port (step 506). The test of step 506 is for a predetermined value returned as the first byte of an ID word. If no keyboard is identified then the Selector bit is tested to determine if it is in its SWAP state (step 508). If the Selector bit is not in the SWAP state then both physical ports have not yet been checked so the Selector bit is set to the SWAP state (step 510). With SWAP set the check for a keyboard is repeated.

If a keyboard is found in step (506) then the keyboard is tested (step 514). The result of the keyboard test is then checked (step 516). If the keyboard passes then the keyboard is initialized and marked as present (step 518). The keyboard is marked present by storing its ID in the extended BIOS data area (EBDA). If the check of the keyboard test in step (516) indicates that the keyboard is not functioning correctly then an error is reported (step 520).

If the Selector bit is set to SWAP in step 508 then a check for keyboardless operation is made (step 512). If keyboardless operation is not indicated by the system console parameter data then POST was expected to find a keyboard and did not so an error is reported (step 520). If keyboardless operation was allowed from step (512) then the procedure continues with no error.

The state of the SWAP bit is saved and called SWAPTMP (522). Next a READ ID command is issued to the logical mouse port (step 530). The ID, if any, is then checked to determine if a mouse device is present (step 532). If a mouse is found then it is marked as present (step 534) and POST then continues (step 542). An IBM or IBM-compatible mouse is identified by a predetermined response, such as 0AAh followed by a value of 00h. Any other pointing device can return any value as a second byte as long as the first byte is 0xAA. If no mouse device was found in step (532) then a check is made if a keyboard had been found previously (step 536). If a keyboard has been found then it is already occupying the other physical port so no swap is necessary and POST is allowed to continue (step 542). If step 536 does not indicate that a keyboard had been previously found then the SWAP bit is compared against SWAPTMP (step 538) and if found to be different then control is passed to step (step 542) and POST continues. If step (538) determines that SWAP is equal to SWAPTMP then this indicates that the other physical port still needs to be checked for a mouse. The SWAP bit is toggled (step 540) and control is routed to again check for a mouse.

To facilitate the service requirements POST always looks for and initializes a keyboard if present. If keyboardless operation is selected, POST suppresses a keyboard error when it occurs. The reason for this is a defective keyboard may look like a missing keyboard to POST. Since POST always tests for a keyboard, the system initializes the keyboard if present. Thus, a Customer Engineer can attach a keyboard to service a machine that is configured as keyboardless.

To provide a mechanism where any system can be configured as keyboardless, POST uses a bit in NVRAM to determine if keyboardless operation is desired. The bit in NVRAM is set up by the set console utility on the reference diskette. This bit in NVRAM is independent of server configuration and independent of the ASCII Console support. Thus, any system can be configured as keyboardless.

While the invention has been illustrated in connection with a preferred embodiment, it should be understood that many variations will occur to those of ordinary skill in the art, and that the scope of the invention is defined only by the claims appended hereto and equivalent.

We claim:

1. A personal computer system having a high speed system processor compatible with application programs and operating system software, said personal computer system normally configured to operate with PC keyboard and a display, said personal computer system comprising:
- a high speed system processor coupled to a high speed data bus;
- a first non-volatile memory electrically coupled to a slower speed data bus, said first non-volatile memory storing present system configuration data representative of a present configuration of the personal computer system;
- a second non-volatile memory electrically coupled to said slower speed data bus, said second non-volatile memory storing predetermined system configuration data, said predetermined system configuration data being representative of a default system configuration having the PC keyboard and display;
- a bus controller for providing communications between the high speed data bus and the slower speed data bus;
- diagnostic means coupled to said slower speed data bus for comparing the present system configuration data to the predetermined system configuration data to determine whether the present system configuration corresponds to the default system configuration and generating a signal indicating the comparison result;
- means coupled to said slower speed data bus for redirecting information to an alternate remote system console in response to said signal indicating that the present system configuration does not correspond to the default system configuration.

2. A computer implemented method for configuring a personal computer system said personal computer system normally configured to operate with PC keyboard and a display, said computer implemented method comprising the steps of:
- storing in a first non-volatile memory means present system configuration data, said data being representative of at least one type of system console connected to the system;
- accessing said present system configuration data with diagnostic means, the diagnostic means testing the system based upon predetermined system configuration data, the predetermined system configuration data including data representing a predetermined system configuration which includes a default system console halving the PC keyboard and the display;
- comparing the present system configuration data to the predetermined system configuration data to determined whether the present system configuration corresponds to the default system configuration and generating a comparison signal;
- redirecting information to an alternate remote system console if the comparison signal indicates the present system configuration does not correspond to the default system configuration.

* * * * *